United States Patent
Miyata et al.

(10) Patent No.: US 7,809,514 B2
(45) Date of Patent: Oct. 5, 2010

(54) FLOW RATE MEASUREMENT DEVICE

(75) Inventors: Hajime Miyata, Kadoma (JP); Yasuhiro Umekage, Kadoma (JP)

(73) Assignee: Panasonic Corporation, Osaka (JP)

( * ) Notice: Subject to any disclaimer, the term of this patent is extended or adjusted under 35 U.S.C. 154(b) by 376 days.

(21) Appl. No.: 11/932,315

(22) Filed: Oct. 31, 2007

(65) Prior Publication Data

US 2008/0270045 A1    Oct. 30, 2008

Related U.S. Application Data

(63) Continuation of application No. PCT/JP2006/309248, filed on May 8, 2006.

(30) Foreign Application Priority Data

| May 9, 2005 | (JP) | ............................. 2005-135978 |
| Jul. 20, 2005 | (JP) | ............................. 2005-209719 |

(51) Int. Cl.
  *G01F 1/00* (2006.01)
  *G01F 7/00* (2006.01)
(52) U.S. Cl. ...................................... 702/45
(58) Field of Classification Search ................... 702/12, 702/45, 50, 100, 106, 179–181, 189; 73/861; 700/282; 707/3, 6, 7, 708, 758, 769, 771
See application file for complete search history.

(56) References Cited

U.S. PATENT DOCUMENTS

| 6,076,542 | A * | 6/2000 | Titus ............................ 137/14 |
| 6,625,549 | B1 * | 9/2003 | Nawa et al. .................... 702/51 |
| 6,691,582 | B1 * | 2/2004 | Nawa et al. ............... 73/861.28 |
| 2009/0240444 | A1 * | 9/2009 | Miyata et al. ................. 702/45 |
| 2009/0240445 | A1 * | 9/2009 | Umekage et al. .............. 702/48 |
| 2009/0271128 | A1 * | 10/2009 | Umekage et al. .............. 702/45 |
| 2010/0017150 | A1 * | 1/2010 | Itou et al. ..................... 702/45 |
| 2010/0138167 | A1 * | 6/2010 | Bessyo et al. ................. 702/45 |

FOREIGN PATENT DOCUMENTS

| EP | 1 881 304 | * | 1/2008 |
| JP | 5-264316 | A | 10/1993 |
| JP | 07-092001 | A | 4/1995 |
| JP | 11-287684 | * | 10/1999 |
| JP | 2001-228177 | A | 8/2001 |
| JP | 2001-330491 | A | 11/2001 |

(Continued)

OTHER PUBLICATIONS

English Translation of JP 2003-149027, May 2003.*

(Continued)

*Primary Examiner*—Michael P Nghiem
(74) *Attorney, Agent, or Firm*—Brinks Hofer Gilson & Lione (57) ABSTRACT

A flow rate measurement device (1) connected to a household gas supply pipe includes: a flow rate sensor (3) which measures a flow rate at predetermined time intervals; a computing unit (6) which differentiate the measured flow rate; a library (7); and an judging unit (8) which compares the differentiated flow rate against an activation threshold value stored in the library (7) and determines a change of the operation state of an appliance connected downstream of the flow rate sensor (3).

20 Claims, 11 Drawing Sheets

FOREIGN PATENT DOCUMENTS

| | | |
|---|---|---|
| JP | 2002-71421 A | 3/2002 |
| JP | 2002-107198 A | 4/2002 |
| JP | 2002-174542 A | 6/2002 |
| JP | 2003-075220 A | 3/2003 |
| JP | 2003-148728 A | 5/2003 |
| JP | 2003-149019 A | 5/2003 |
| JP | 2003-149027 A | 5/2003 |
| JP | 2003-194331 A | 7/2003 |
| JP | 2003-279390 A | 10/2003 |
| JP | 2008224279 * | 9/2008 |

OTHER PUBLICATIONS

English Abstract of 11-287684, Oct. 1999.*
English Abstract of JP 2008224279, Sep. 2008.*

* cited by examiner

| T1 | T2 | T3 | T4 | T5 | Q1 | Q2 | Q3 | Q4 | Q5 |
|---|---|---|---|---|---|---|---|---|---|
| 2.5 | 4.5 | 13 | - | - | 43 | 145 | 205 | - | - |

Pattern table

FLOW RATE MEASUREMENT DEVICE

This application is a continuation of PCT/JP2006/309248, filed May 8, 2006, which claims priority to Japanese Application Nos. JP2005-135978 filed May 9, 2005 and JP2005-209719 filed Jul. 20, 2005. The entire contents of these applications are incorporated herein by reference.

TECHNICAL FIELD

The present invention relates to a gas meter interposed in a gas supply line entering a residential or commercial building for measuring the volume of gas consumption and, more particularly, to a technique for identifying gas appliances being in use in order to provide new billing schemes which bill differently based on the types of gas appliances and the ways they are used.

BACKGROUND ART

An example of the conventional flow rate measurement device of this kind is disclosed in Unexamined Japanese Patent Publication No. 2002-71421.

Gas meters include a gas flow meter and are interposed in gas supply lines entering residential buildings. The conventional gas meter achieves different billing schemes for respective gas appliances in such a manner that a plurality of integrators are connected to the gas meter which function separately to calculate a volumetric sum of gas flowing during a predetermined time zone and a volumetric sum of flows which fall within a specific flow range. That is, volumetric sums of gas flows are separately calculated according to different time zones and different flow ranges and used to bill under the different billing schemes.

Figure 13:
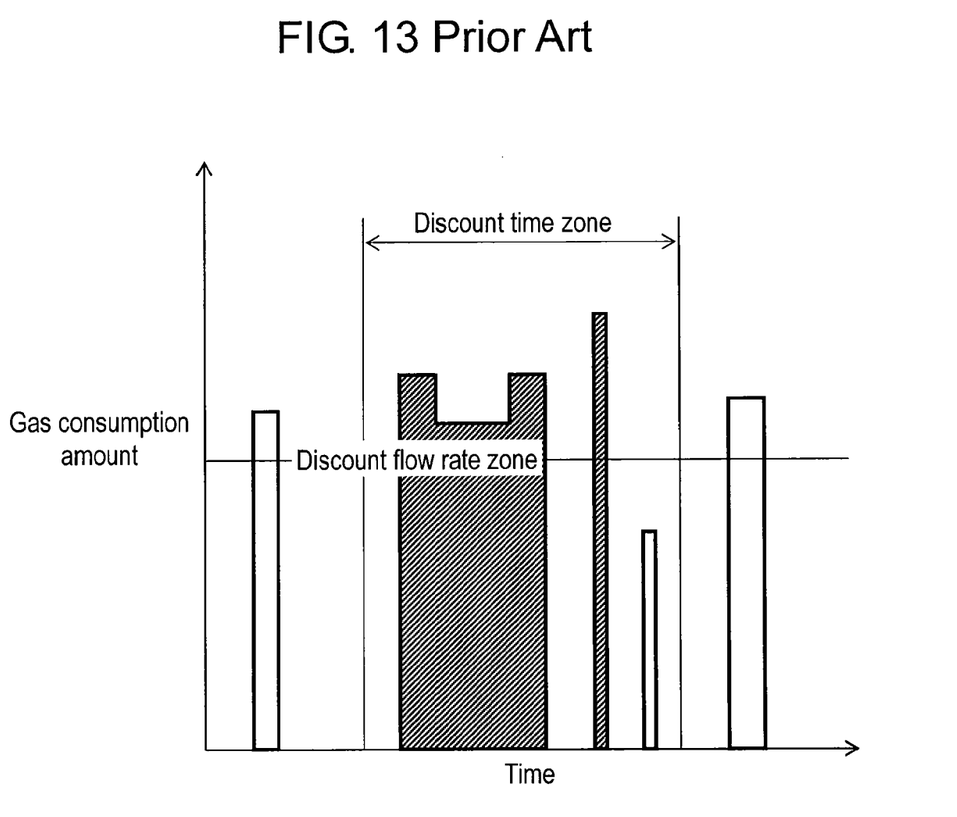
FIG. 13 is a graph showing consumptions of gas for use in explaining discount billing schemes performed by a conventional flow rate measurement device.

An example of the billing scheme will be described with reference to FIG. 13. At least one discount consumption threshold and at least one discount time zone are prescribed in advance. A discount rate is applied to a volume of gas which has been consumed above the discount consumption threshold and within the discount time zone. For example, the shadowed areas of gas consumption shown in FIG. 13 are subject to discount. However, this method falls short of identifying gas appliances used and thus cannot provide a billing statement transparent to customers so as to conveniently identify rates billed in connection with specific gas appliances. On the other hand, Japanese Patent Application No. 2003-149027, for example, discloses a method of identifying a particular gas appliance.

Figure 14:
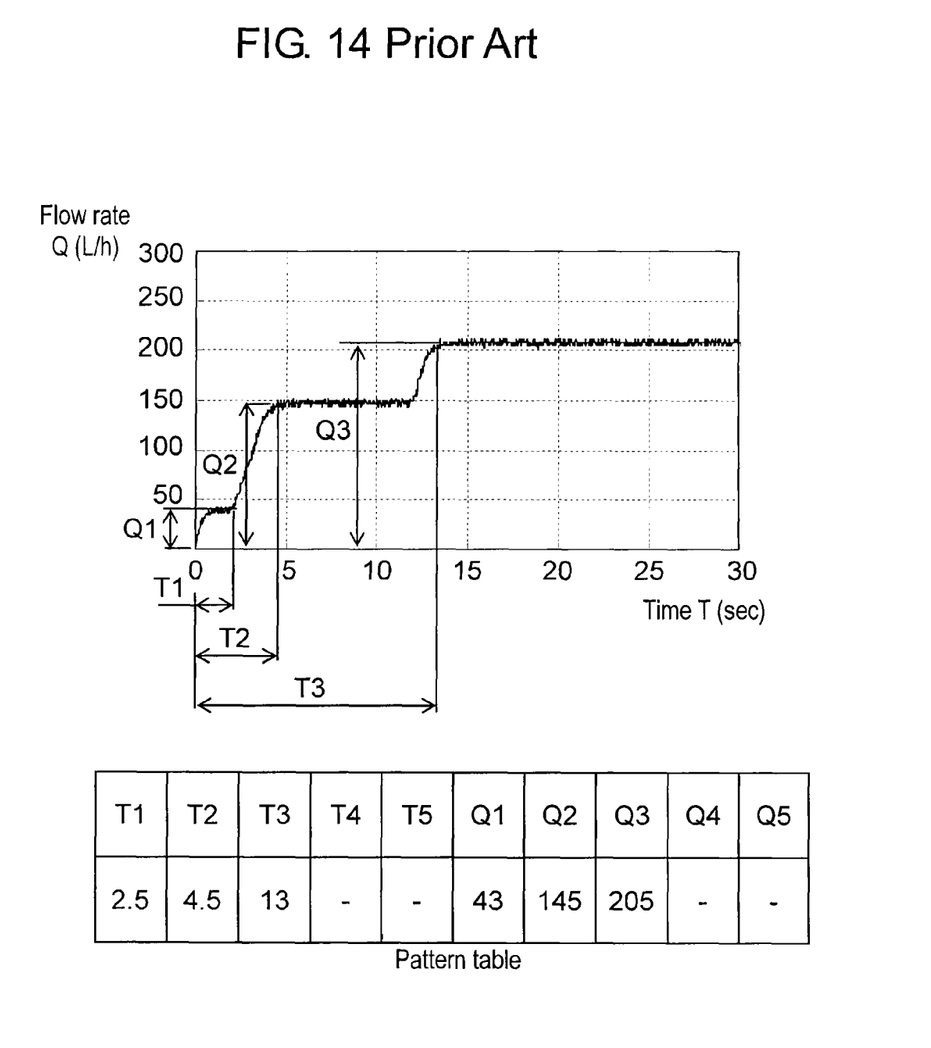
FIG. 14 is a graph showing a flow profile and a flow profile table for use in explaining an appliance identification method performed by a conventional flow rate measurement device.

The operation of a flow rate measurement device of this kind will be described with reference to FIG. 14. FIG. 14 shows a profile of gas consumption exhibited by a gas appliance during the beginning of the consumption thereby and reference values (a profile table) for use in determining profile matching. For a single gas appliance, as many profile tables are prepared as the consumption profiles the single gas appliance is to exhibit under the different combustion controls performed on the gas appliance. In addition, these profile tables are prepared for each of the gas appliances used in a household. In use, these profile tables are looked up to search for one profile which matches the flow profile actually measured by the flow rate measuring device of the gas meter and thereby identify the gas appliance being in use.

In the conventional method as discussed above, however, a plurality of profiles have to be prepared for identifying a single gas appliance. Therefore, when many gas appliances are subject to identification, a number of tables will have to be prepared, and a search for the matching profile will be prolonged. Hence, the apparatus for use in identification will become expensive. So will the gas meter itself. In addition, in order to identify a plurality of gas appliances being used simultaneously, the profile tales have to be prepared for all possible combinations of gas appliances. The number of the combinations may sometimes be enormous. The conventional method is therefore flawed in that it cannot provide a practical solution to identifying a plurality of appliances.

SUMMARY OF THE INVENTION

A flow rate measurement device of the present invention includes: a flow rate sensor which measures a flow rate at predetermined time intervals; a computing unit which differentiate the measured flow rate; a library; and a unit which compares the differentiated flow rate against an activation threshold value stored in the library and determines a change in the operation state of an appliance connected downstream of the flow rate sensor.

The above-described configuration can provide a flow rate measurement device capable of discriminating a plurality of appliances from each other in short time.

PREFERRED EMBODIMENTS FOR CARRYING OUT OF THE INVENTION

Embodiments of the present invention will be described hereinbelow with reference to the drawings.

First Embodiment

Figure 1:
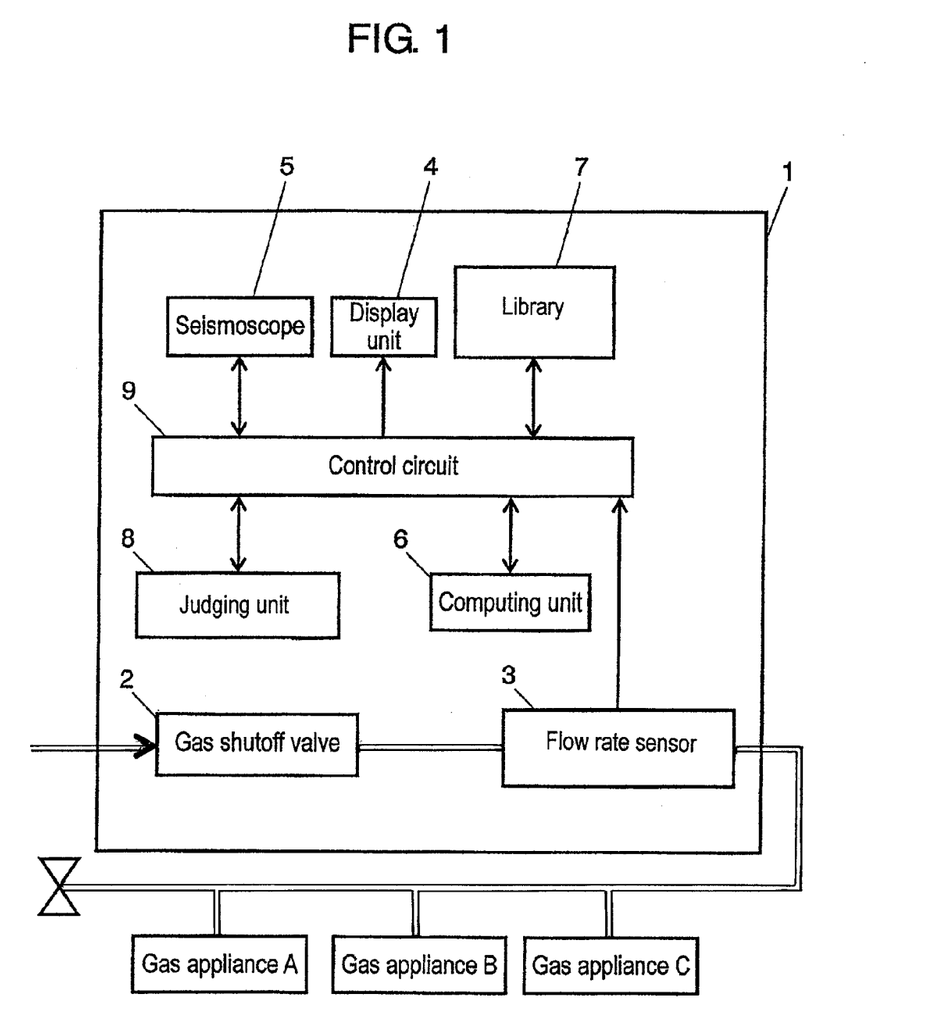
FIG. 1 is a block diagram showing a flow rate measurement device of a first embodiment according to the present invention.
Figure 2:
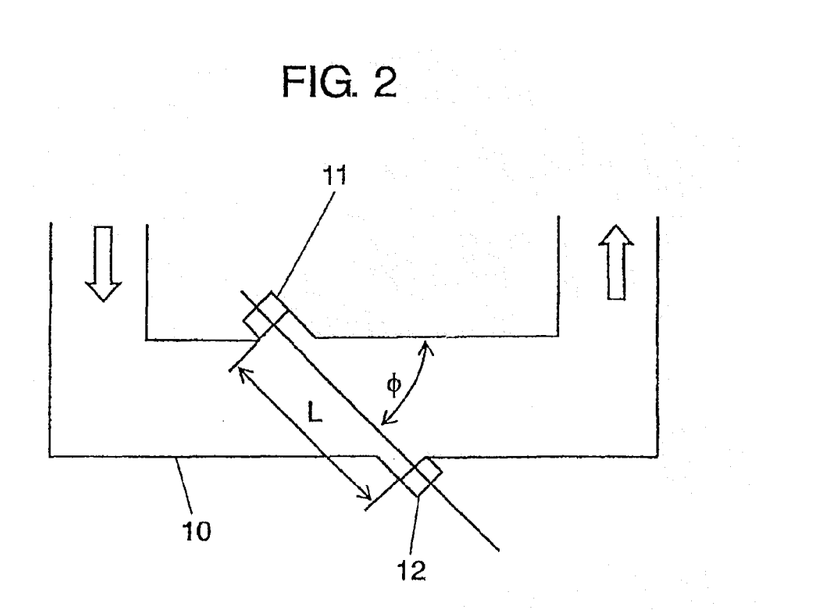
FIG. 2 is a schematic view showing a flow rate sensor used in the flow rate measurement device shown in FIG. 1.
Figure 3:
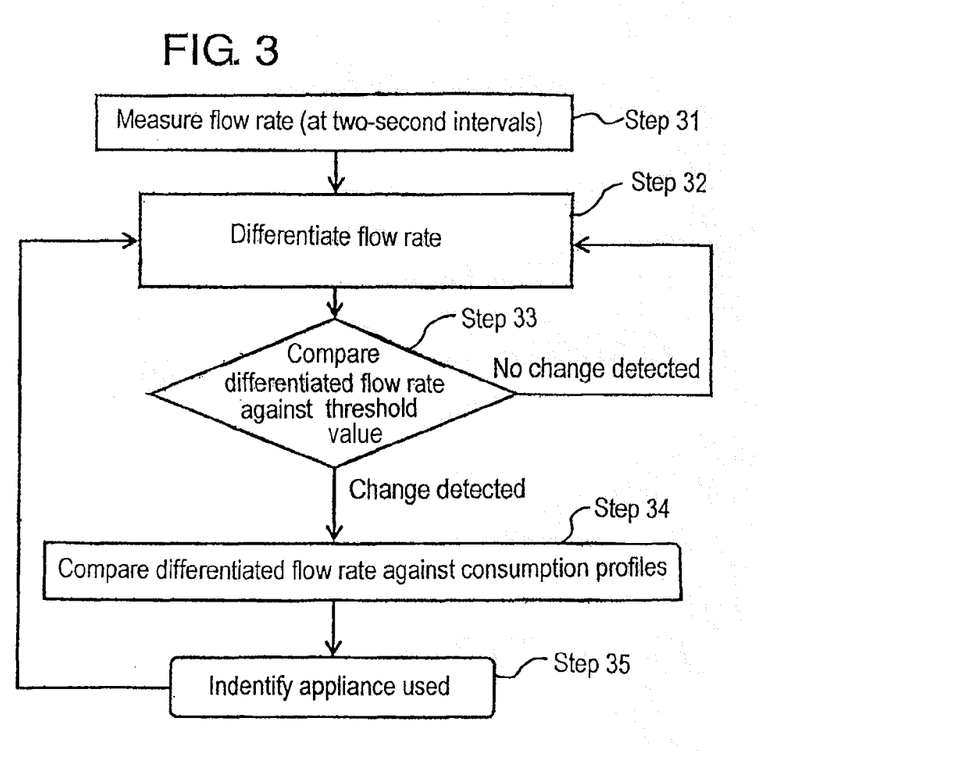
FIG. 3 is a flowchart showing a judging operation of the flow rate measurement device shown in FIG. 1.
Figure 4:
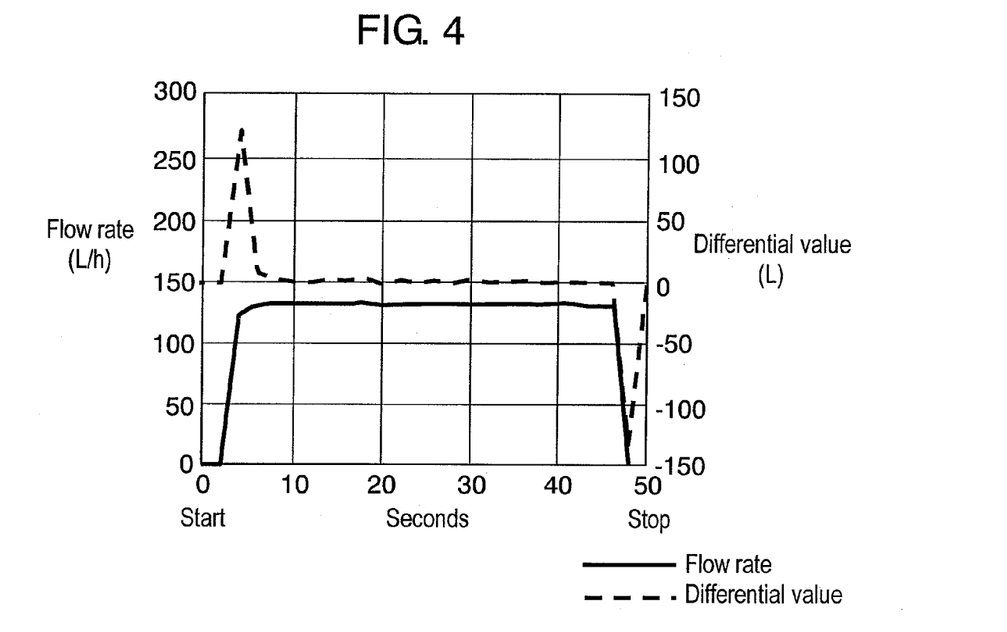
FIG. 4 is a graph showing a profile of exemplary gas consumption and its differentiated profile calculated by the flow rate measurement device shown in FIG. 1.
Figure 5:
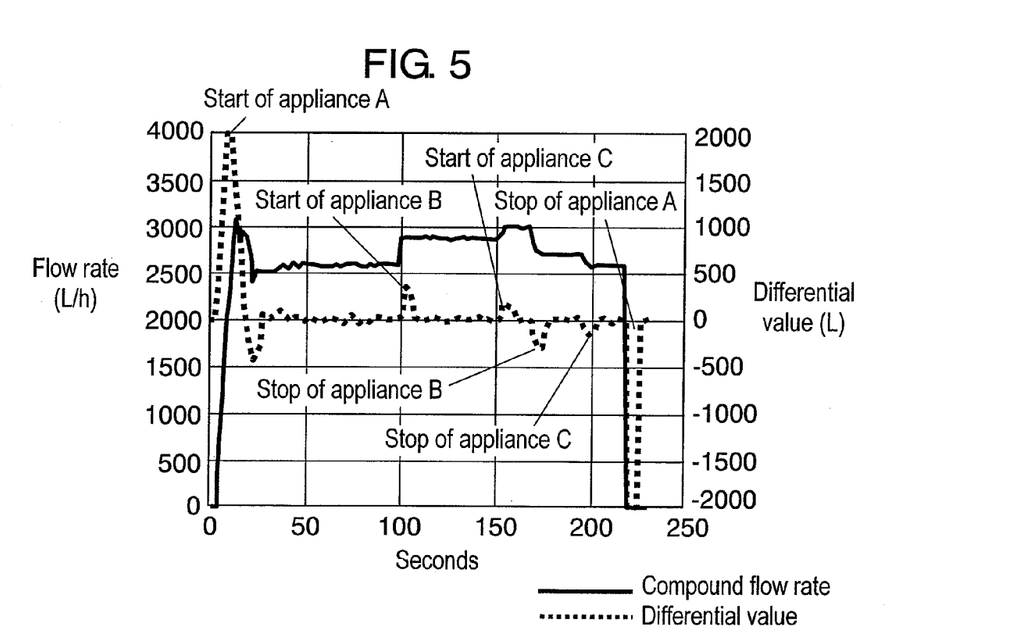
FIG. 5 is another graph showing a profile of gas consumption and its differentiated profile calculated by the flow rate measurement device shown in FIG. 1.

FIG. 1 is a block diagram showing the flow rate measurement device of a first embodiment according to the present invention. FIG. 2 is a schematic view showing the flow rate sensor used in the flow rate measurement device of FIG. 1. FIG. 3 is a flowchart showing the judging operation performed by the flow rate measurement device of FIG. 1. FIG. 4 is a graph showing a profile of exemplary gas consumption and its differentiated profile calculated by the flow rate measurement device of FIG. 1. FIG. 5 is another graph showing a profile of gas consumption and its differentiated profile calculated by the flow rate measurement device of FIG. 1.

In FIG. 1, the flow rate measurement device of the first embodiment comprises: a flow rate sensor 3 which measures a flow rate at regular time intervals; a computing unit 6 which differentiate the flow rate measured by the flow rate sensor 3; a library 7; and a judging unit 8 which compares the magnitudes of the flow rate differentiated by the computing unit 6 and one of at least one threshold value stored in the library 7 and determines whether any gas appliance connected downstream of the flow rate sensor 3 has become in use.

The configuration of the flow rate measurement device of the first embodiment will be described in detail with reference to FIG. 1. In FIG. 1, the flow rate measurement device 1 is interposed in a gas supply line. One or more gas appliances, e.g., gas appliance A, gas appliance B, and gas appliance C, are connected downstream of the line within a customer's residence.

The flow rate measurement device 1 comprises a gas shut-off valve 2 and the flow rate sensor 3 both interposed in the gas passage communicating with the gas line. The flow rate measurement device 1 also comprises a display unit 4 which processes signals from the flow rate sensor 3 and displays a volume of consumed gas, and a seismoscope 5 which detects vibrations such as caused by an earthquake. To identify, according to the present invention, a gas appliance being in use, the flow rate measurement device 1 also comprises the computing unit 6, the library 7, the judging unit 8, and a control circuit 9 which controls the operation of seismoscope 5, an identification of a gas appliance being in use, a security function and other functions. The flow rate measurement device 1 comprises a battery (not shown) as a power source for the functional elements thereof.

The library 7 stores the at least one threshold value and profiles of gas consumptions by a plurality of gas appliances. The at least one threshold value functions as a threshold to determine whether any changes occur to gas flow. The consumption profiles are indicative of profiles of gas consumptions exhibited by gas appliances during the outset of gas consumption. The library 7 storing the data is made preferably of a semiconductor memory in the first embodiment. It should be noted that a magnetic recording medium or other memory devices can be employed as long as they permit to add and update data.

The flow rate sensor 3 provided in the flow rate measurement device 1 of the embodiment may be an ultrasonic flow meter (ultrasonic measuring instrument) or an instantaneous flow measurement device. Other flow rate measuring methods, such as the fluidic method, may be used if they can measure continuously at regular cycles in a short time.

The operation of the flow rate measurement device 1 according to the embodiment will be described below. First, a description will be made on the ultrasonic flow measurement with reference to FIG. 2. In FIG. 2, the cross section of a measurement passage 10 is rectangular in shape. The walls of the measurement passage 10 facing perpendicular to the gas flow direction have a pair of ultrasonic transmitters/receivers 11 and 12 attached respectively to the walls. The pair of ultrasonic transmitters/receivers 11 and 12 are arranged with one located upstream of the other and diagonally aligned with each other at an angle $\phi$ with respect to the measurement passage 10. The ultrasonic transmitters/receivers 11 and 12, while transmitting and receiving ultrasonic sounds alternately between them, measure at regular intervals differences of time the ultrasonic sounds travel back and forth against and along the gas flow, and output a propagation time difference signal. A calculator (not shown) receives the propagation time difference signal and calculates the speed of gas movement and the volume of gas flow.

The equation used for calculation is presented below. In FIG. 2, L denotes a measurement distance. Flow speed V is expressed as follows:

$$V = (L/2 \cos \phi) \times (1/t1 - 1/t2)$$

where t1 denotes a travel time from the upstream and t2 denotes a travel time from the downstream.

The time intervals for measurement may be set within a range where an alternative transmission and reception of ultrasonic sounds can be executed. The first embodiment adopts two (2) seconds as the base time intervals. It should be noted that the measurement is possible at shorter time intervals. Since there are gas appliances which complete the initial consumption stage within two seconds, the time intervals, if set shorter, will realize an advantage of instantaneously identifying those gas appliances. However, as the measurement intervals become shorter, a problem surfaces that the battery exhausts more quickly. On the other hand, if the measurement intervals are set longer than those of two-digit seconds such as those adopted in the conventional diaphragms gas meter, it becomes impossible to judge on the differentiated gas flow, using the algorithm of the first embodiment. Therefore, the first embodiment adopts two seconds for the base measurement intervals, which is a trade off between the costs associated with shortening the intervals and the limit to the performance of identifying a gas appliance which is posed by longer intervals.

Next, the steps of determining an operation state of a gas appliance will be described with reference to FIG. 3. The flow rate measurement device 1 measures a gas flow rate every two seconds as described above and sends the data to the computing unit 6 (Step 31), which differentiates the measured flow rate and outputs derivatives of the flow rate at two-second intervals (Step 32).

The derivatives are sequentially transmitted to the judging unit 8 and compared there with the at last one threshold value stored in the library 7 (Step 33). When the differentiated flow rate exceeds the threshold value, it is determined that the operation state of the gas appliance has changed. When a change is detected, to further determine which gas appliance is in what operation state, the judging unit 8 compares the differentiated gas flow against the consumption profile of each of the gas appliances stored in the library 7 (Step 34) and identifies the gas appliance whose operation state has just changed (Step 35).

FIG. 4 shows a profile of exemplary gas consumption exhibited during the use of a gas appliance and its differentiated profile. In the graph shown in FIG. 4, the solid line represents the profile of gas consumption measured by the flow rate sensor, and the broken line represents the differentiated profile of the measured gas consumption, that is, the derivatives of the measured gas consumption calculated every two seconds. In the outset of the consumption, the differentiated profile exhibits a positive spike. In the end of the gas consumption or the shutdown of the gas appliance, the differentiated profile exhibits a negative spike.

FIG. 5 is a graph showing a profile of gas consumption collectively exhibited when three appliances A, B, and C are simultaneously used and the differentiated profile of the collective gas consumption. The graph shows changes of the gas consumption which occur when the three appliances are started and shutdown at different times.

The judgments results will be confirmed by displaying, on the display unit 4, information from the library 7 through the control circuit 9 or by transmitting the information to an external terminal (not shown).

Second Embodiment

Figure 6:
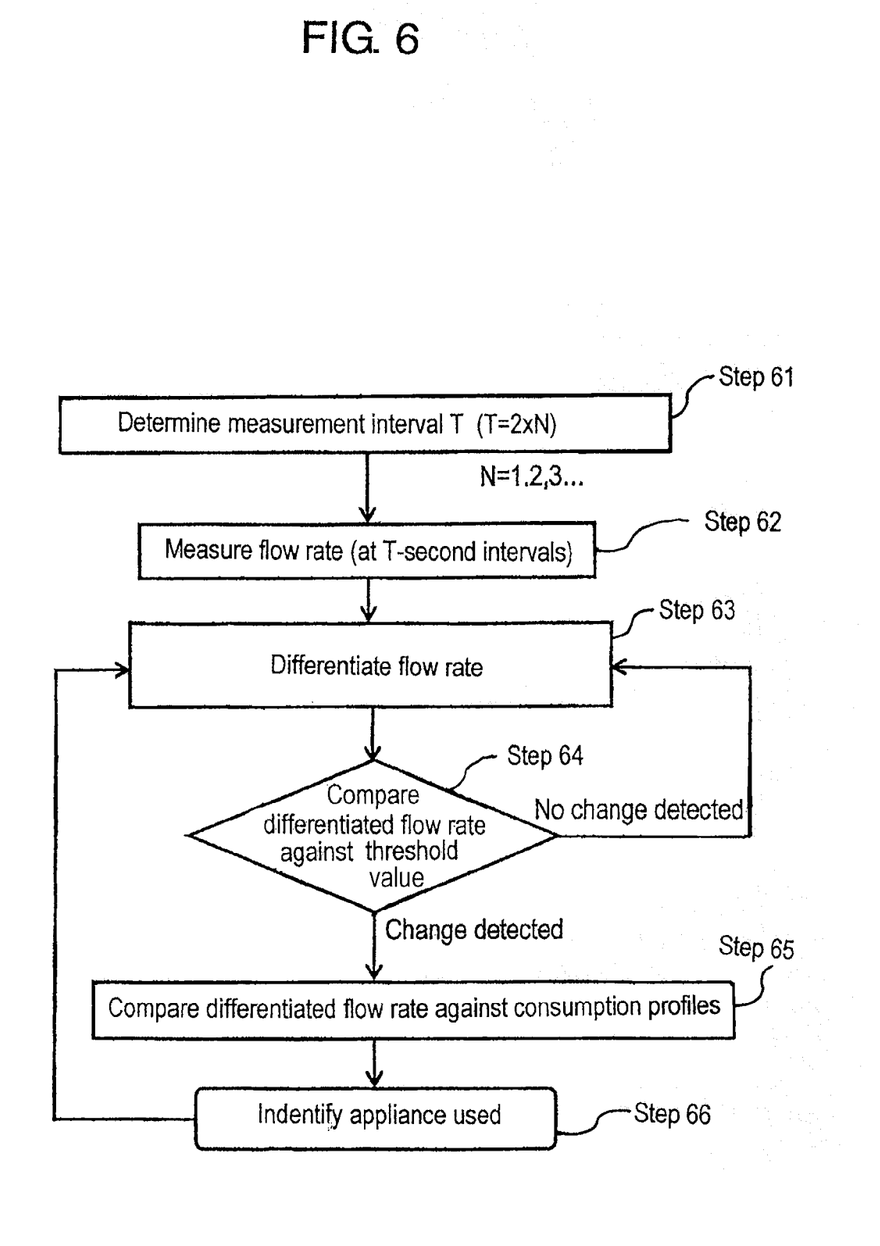
FIG. 6 is a flowchart showing a judging operation of a second embodiment according to the present invention.

FIG. 6 is a flowchart showing a judging operation of the second embodiment according to the present invention. The second embodiment differs from the first embodiment in that the derivatives of the measured gas consumption are computed by the computing unit 6 at regular intervals which are adjustable to the base measurement time intervals (two seconds in the first embodiment) multiplied by an integer (N) (Step 61). The basic structural configuration and function of the flow rate measurement device 1 are similar to those of the first embodiment (See Steps 31-35 of FIG. 3 for description of the operations in Steps 62-66).

In the second embodiment, the derivatives are computed by the computing unit 6 at regular intervals which are valuable to two-second intervals multiplied by an integer in accordance with stored information (Step 64). Some gas appliances take some time to start-up. The derivatives of gas consumption exhibited by such gas appliances, if calculated at two-second intervals, can show changes of the gas consumption rate but may not be able to show profiles clearly recognizable as peculiar to such gas appliances. In order to reliably identify such gas appliances, the time intervals to calculate derivatives are adjusted according to information stored in the library 7. It should be noted that although the first and second embodiments adopt two-second time intervals and two-second time intervals multiplied by an integer, an identification of a gas appliance can of course be made with other time interval values.

Figure 7:
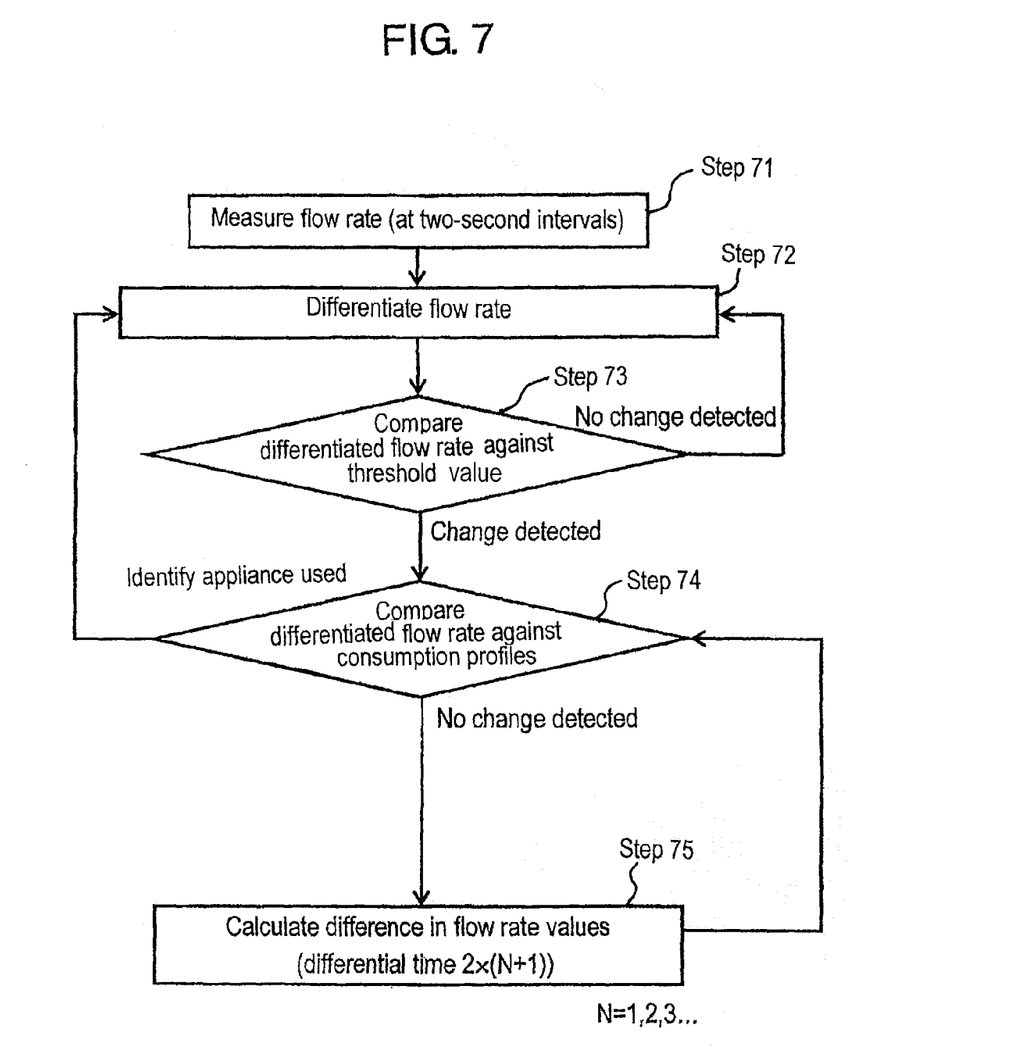
FIG. 7 is another flowchart showing a judging operation of the second embodiment according to the present invention.

FIG. 7 is another flowchart showing the judging operation of the second embodiment according to the present invention. In the flowchart of FIG. 7 (See Steps 31 and 32 of FIG. 3 for description of the operations in Steps 71 and 72), when the differentiated flow rate exceeds the threshold value and therefore the operation state of a gas appliance is determined to have changed (Step 73), the process proceeds to identify the gas appliance. The judging unit 8 compares the differentiated profile of the gas consumption against each of the consumption profiles of gas appliances stored in the library 7 to thereby identify the gas appliance (Step 74). If no match is found among the stored profiles, the judging unit 8 repeats the steps of increasing the time intervals (Step 75) and comparing a new differentiated profile against the stored profiles (Step 74) until a match is found. Accordingly, a gas appliance which cannot be identified with the two-second time intervals will be identified with automatically increased time intervals.

Third Embodiment

Figure 8:
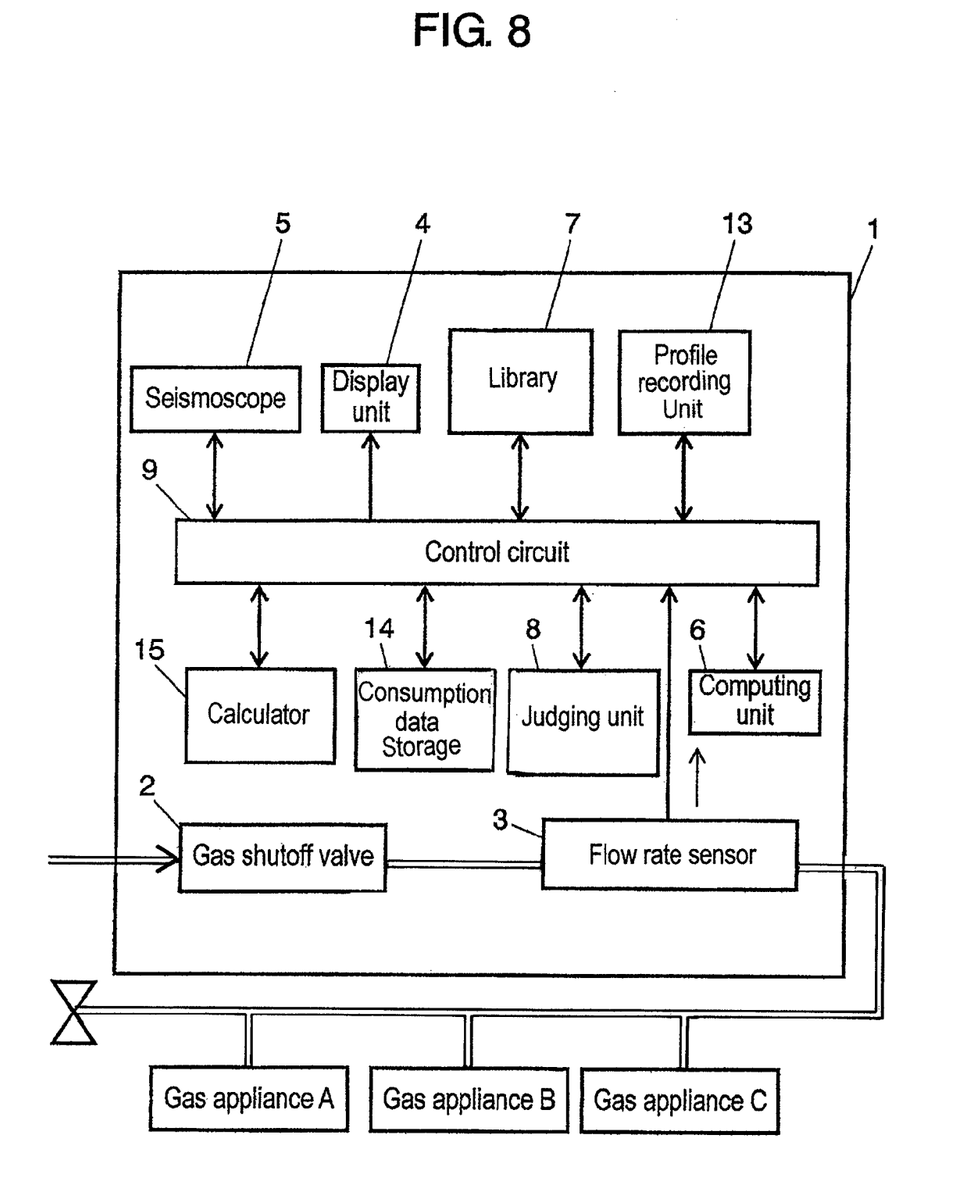
FIG. 8 is a block diagram showing a flow rate measurement device of a third embodiment according to the present invention.
Figure 9:
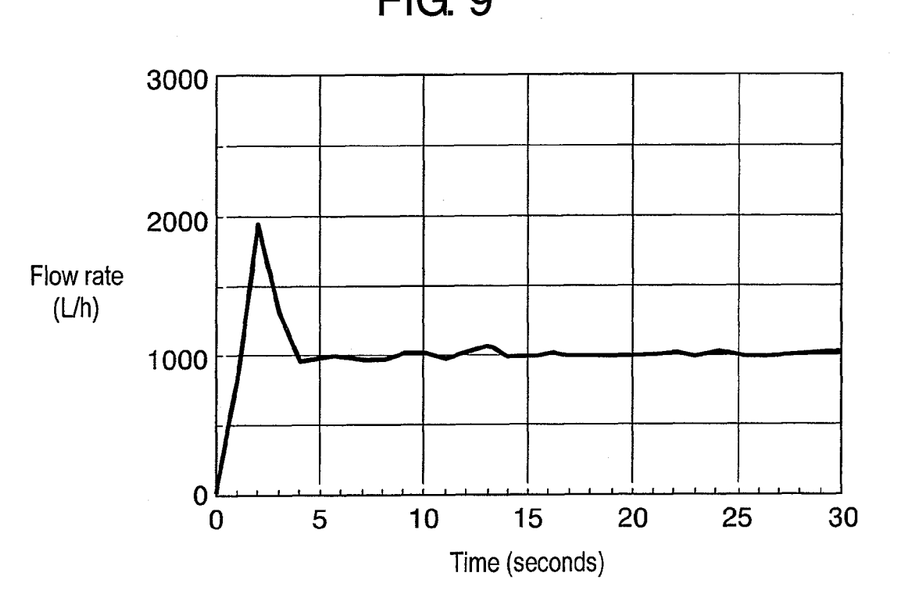
FIG. 9 is a graph showing a gas flow measured by the flow rate measurement device shown in FIG. 8.

FIG. 8 is a block diagram showing the structural configuration of a flow rate measurement device according to the third embodiment of the present invention. FIG. 9 is a graph showing a profile of gas consumption measured by the flow rate measurement device shown in FIG. 8. The flow rate measurement device of the third embodiment shown in FIG. 8 differs from the first embodiment shown in FIG. 1 in that the flow rate measurement device comprises a consumption data storage 14 which stores a history of gas consumptions measured by the flow rate sensor 3, and a profile recording unit 13 which records a profile of gas consumption measured for a predetermined time by the flow rate sensor 3. Since the basic structural configuration and function of the flow rate measurement device 1 are similar to those of the first embodiment, description of the common structure and function will be omitted.

The operations and effects peculiar to the third embodiment will be described below. First, by the operation of the judging unit 8, the number of gas appliances being in use can be determined. Description of the third embodiment will be directed to the operation of determining that only one gas appliance is in use.

For example, when the flow rate measured by the flow rate sensor 3 has changed from zero flow rate (or near zero flow rate, 0±3 L/h) by a predetermined threshold value or more (for example, 10 L/h or more), it is determined that one gas appliance has become in use. When so determined, the measured flow rate begins to be recorded as a profile of gas consumption by the gas appliance. The recording operation will continue for a predetermined time (for example, 30 seconds), and the recorded measured flow rate will be used as profile information of consumption. FIG. 9 shows a profile of exemplary gas consumption. Please note that the above description that the operation begins when the flow rate changes from zero, means more specifically that the operation begins when the flow rage changes from zero after the flow rate remains zero for a while (for example, 10 seconds or longer).

Right after its installation, the flow rate measurement device 1 may be kept operational to operate automatically for a time period adjustable from about one day to about a week. This time period is a learning time period. When the judging unit 8 determines that only one appliance has become in use during this learning time period, the profile recording unit 13 records a profile of gas consumption by the gas appliance.

As explained above, a consumption profile is recorded when only one gas appliance is in use. To prevent the consumption profile of the same gas appliance from being recorded multiple times, learning is made to determine whether to record a consumption profile, based on a consumption profile exhibited in the beginning of the consumption, the absolute value of the gas consumption and the like, whereby recordation for the same gas appliance is prevented from occurring more than once. When the profile recording unit 13 operates to automatically record consumption profiles, it may be difficult to relate the recorded consumption profiles to the identities of gas appliances (for example, a water heater, a kitchen range, or the like) which are then in use and causing the gas flow. The judging unit 8 operates to thereafter identify the identities of gas appliances, whereby relations between the recorded consumption profiles and the identified gas appliances are established.

The profile recording unit 13 can be initiated manually to operate when necessary. When the identity of a gas appliance being in use is known, a measured consumption profile is recorded in the library 7 in relation to the identity of the appliance (for example, a water heater, a kitchen range, or the like). For example, a kitchen range (a small burner, a large burner, and a grill) and a water gas heater are sequentially started and shutdown to make identifiable a gas appliance being then in use. Thereby, the measured consumption profile can be recorded in relation to the identity of the gas appliance causing the gas flow. It is also possible to add a new consumption profile or update the recorded profile, using both the operation of automatically recording measured consumption profiles and the operation of recording profiles while gas appliances are manually sequentially operated.

For each of gas appliances identified by the judging unit 8, a calculator 15 calculates a volume of gas consumed, using a protocol stored therein. Two or more gas appliances are normally used simultaneously. When two or more gas appliances are used simultaneously, it is difficult to calculate a volume of gas consumed by each of the gas appliances. The third embodiment determines a volume of gas consumed in each of the blocks shown in FIG. 10, and then determines a volume of gas consumed by each of the gas appliances based on the changes of the consumption volumes in the blocks.

Figure 10:
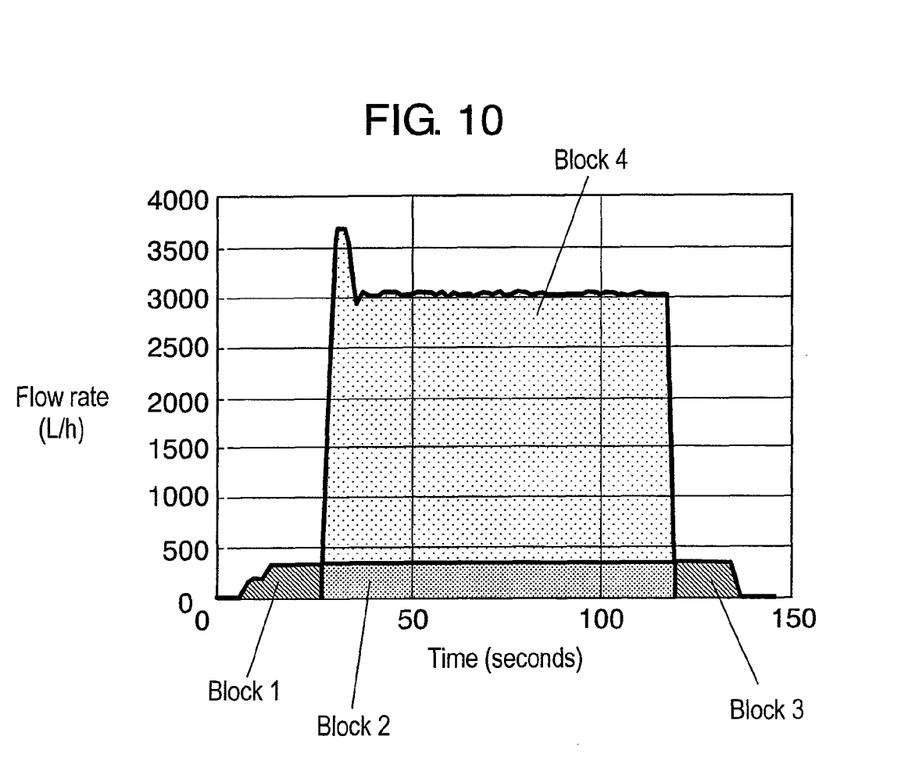
FIG. 10 is another graph showing a gas consumption measured by the flow rate measurement device shown in FIG. 8.

For example, in the example in FIG. 10, if it is determined from the consumption profile exhibited at the beginning of the consumption that the gas flow in block 1 is caused by a gas fan heater, the collective volume of gas consumptions in blocks 1, 2 and 3 is calculated as the volume of gas consumed by the gas fan heater. The volume of gas consumed in block 4 is obtained by subtracting the volume of gas consumed in blocks 1-3 by the gas fan heater from the total volume of the entire gas consumption. Another method available may be to estimate a volume of gas consumption based on a time duration for use, using a predetermined equation. Although the accuracy varies among the methods used, the judging unit 8 makes possible to obtain a volume of gas consumed by each gas appliance.

Fourth Embodiment

Figure 11:
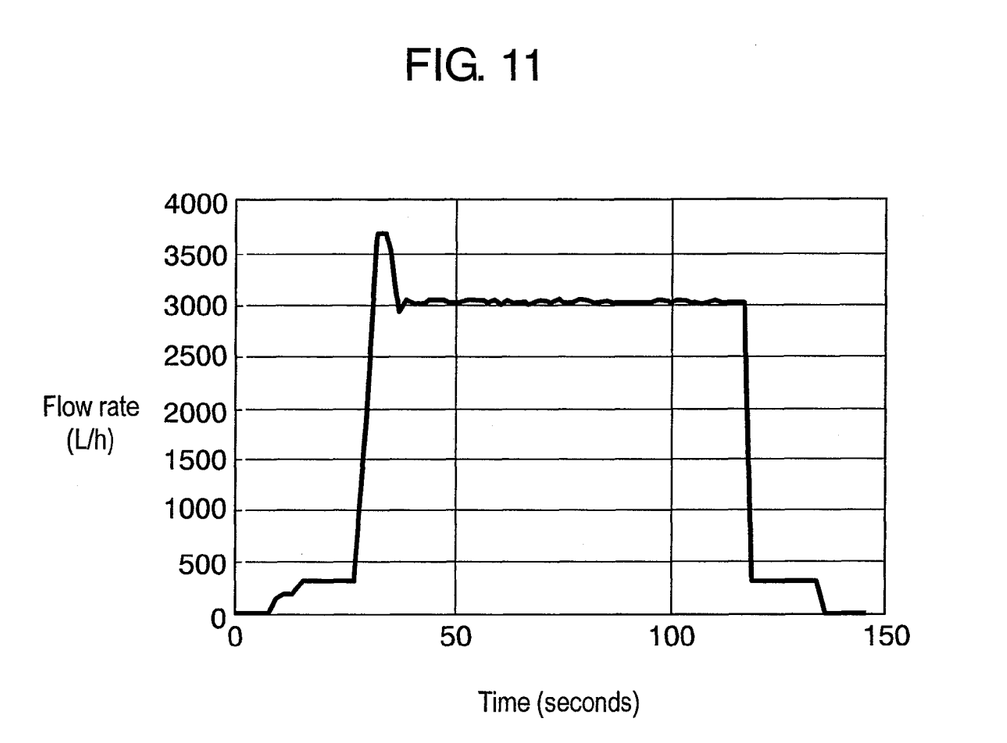
FIG. 11 is a graph of a profile of a gas consumption measured by a fourth embodiment of the invention.
Figure 12:
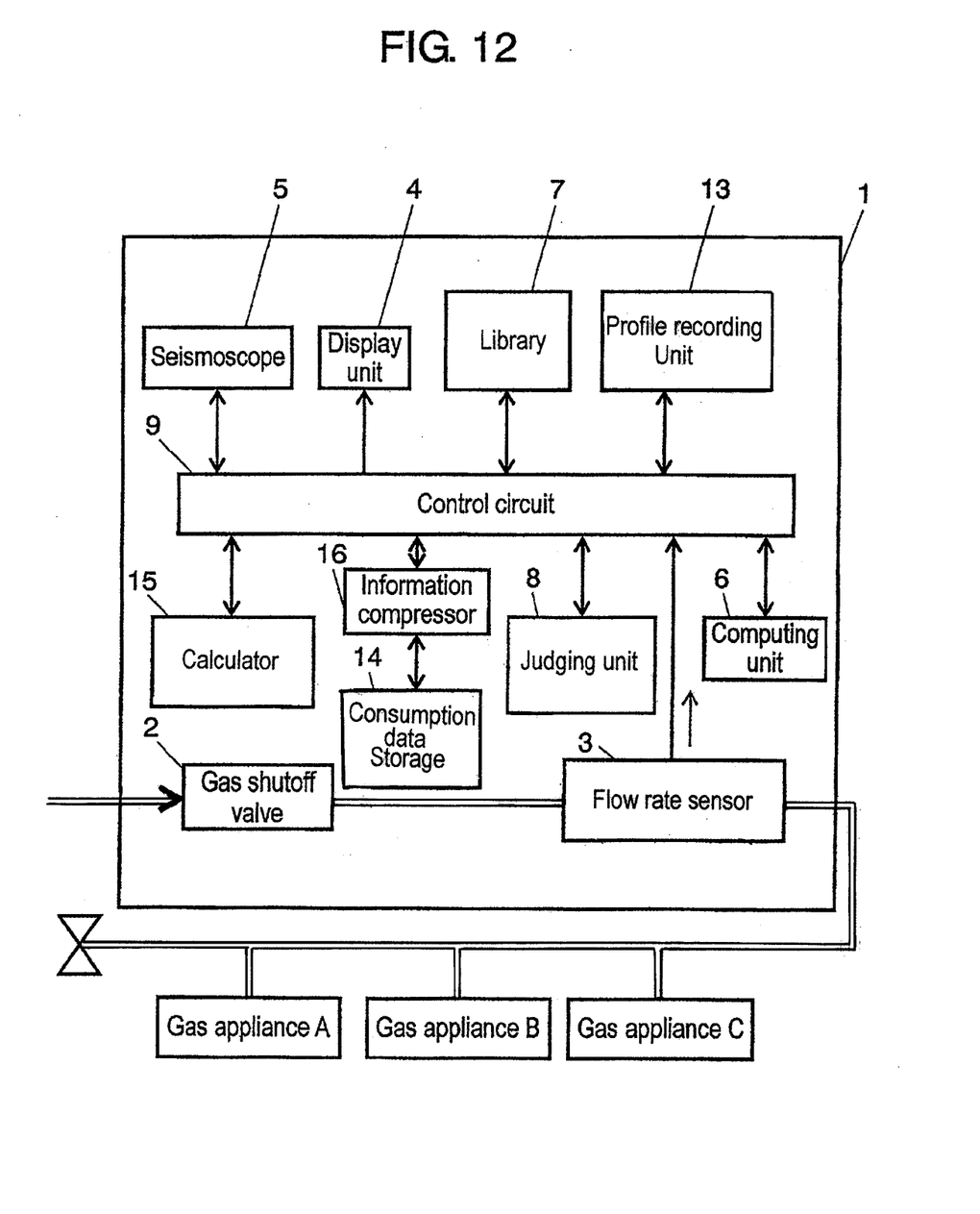
FIG. 12 is a block diagram showing a flow rate measurement device of the fourth embodiment according to the present invention.

FIG. 11 is a graph showing a profile of gas consumption for use in explaining how the judging unit 8 of the flow rate measurement device 1 according to the fourth embodiment, stores gas consumption data. FIG. 12 is a block diagram showing the flow rate measurement device of the fourth embodiment according to the present invention. Description will be made only on the difference between the first embodiment and the fourth embodiment. As shown in FIG. 12, the profile storage 14 has an information compressor 16 which compresses consumption data in the time direction.

The information compressor 16 compresses the gas consumption data as shown in FIG. 11 in the time direction within a range where the flow rate is constant. In the first embodiment, a gas appliance is identified based on a differentiated profile of gas consumption exhibited during the beginning of the consumption. In the fourth embodiment, a gas appliance is identified based on a compressed profile obtained during the operation of a gas appliance from the start-up to the shutdown. Information on the time points where compression begins and ends is stored in the library 7. The information will be used to calculate a volume of gas consumed by the gas appliance.

Since raw profile data, if recorded for a long time, may be enormous in size, the consumption data is compressed by leaving out a portion of the consumption which is constant, in order to reduce the data size. Not only a profile of gas consumption measured by a gas meter is compressed in the time direction, but also a differentiated profile at regular intervals may be compressed.

As discussed above, in one aspect of the present invention, the flow rate measurement device of the present invention comprises: the flow rate sensor which measures a flow rate at regular time intervals; the computing unit which differentiate the flow rate output from the flow rate sensor; the library; and the judging unit which compares the flow rate differentiated by the computing unit against an activation threshold value stored in the library to determine whether any gas appliance has become in use which is connected downstream of the flow rate sensor. This aspect of the invention makes possible to determine a change of the operation state of a gas appliance with a simple algorithm as quickly as the measuring instrument operates.

In another aspect of the present invention, the judging unit compares a differentiated profile of gas consumption calculated by the computing unit against a plurality of consumption profiles stored in the library and identifies a gas appliance being in use among a plurality of gas appliances. This aspect of the invention makes possible to determine the number of gas appliances being in use and the operation states of the gas appliances.

Further in another aspect of the present invention, the computing unit can adjustably change time intervals to differentiate the flow rate measured by the flow rate sensor. By changing time intervals to differentiate the flow rate, it becomes possible to accurately determine changes of gas consumption by each gas appliance adaptively to differences in gas consumption among the gas appliances.

Further in another aspect of the invention, when the differentiated flow rate measured by the flow rate sensor exceed the activation threshold value stored in the library, the computing unit increases time intervals to differentiate the flow rate until a match is found between the differentiated flow rate and one of the consumption profiles stored in the library so that the judging unit can identify the gas appliance being in use. The aspect of the invention makes possible to reliably determine changes of gas consumptions by gas appliances.

Another aspect of the invention comprises: a consumption data storage which stores a history of gas consumptions measured by the flow rate sensor and times of the measurements; and the profile recording unit which record in the library a profile of gas consumption measured for predetermined time, wherein a profile of gas consumption measured by the flow rate sensor is compared against the consumption profiles recorded by the profile recoding unit to identify a gas appliance being in use which is connected downstream of the flow rate sensor. This aspect of the present invention makes possible to determine the operations states of a plurality of appliances and also determine the identity of a gas appliance being in use if the consumption profiles are stored in relation to the identities of gas appliances (water heater, kitchen range, and the like) which caused the consumptions.

Further in another aspect of the invention, when the judging unit determines that only one gas appliance is in use, a profile of gas consumption is recorded in the profile recording unit. A profile of gas consumption can be measured when it is determined that only the one gas appliance is in use. Accurate information can be recorded to thereby improve the accuracy of identifying a gas appliance.

Further in another aspect of the invention, the profile recording unit can be initiated to operate when necessary and can learn such that it adds to and update the recorded profiles. Since a profile can be added and updated, a newly installed gas appliance can be identified.

Another aspect of the invention comprises an information compressor which compresses a profile of gas consumption in the time direction and stores the compressed profile in the profile storage. A consumption profile can be compressed by leaving out a portion of the profile in which the flow rate remains unchanged or does not show any profile specific to a particular gas appliance. Therefore, the amount of data to be stored can be reduced. The computational load on a microcomputer or the like can be lessened to thereby save a battery.

The flow rate measurement device may further include a calculator which calculates a volume of gas consumed by each of appliances based on results of identification by the judging unit. This aspect of the invention makes possible to determine a volume of gas consumed by each gas appliance, using identification results from the judging unit and to thereby establish different billing schemes for respective gas appliances. In a plant facility, management of gas consumption will become possible for each of the gas appliances in the facility.

The flow rate measuring instrument may use an instantaneous flow rate sensor, such as an ultrasonic flow meter. In this aspect of the invention, the flow rate measurement device, responding quickly to a flow rate change, can implement an appliance identification operation and a learning operation. Since the flow rate measuring device can quickly respond to even a fine change of flow rate, the accuracy of identifying appliances will improve.

The flow rate measurement device of the present invention can identify appliances connected in a gas passage. Even when a plurality of appliances are simultaneously used, the flow rate measurement device can identify the appliances being in use, based on the number of appliances being in use and the flow rate information. The flow rate measurement device of the present invention differentiates a flow rate detected by the sensor at regular intervals and determines a change of the operation state of a gas appliance based on the differentiated flow rate. The flow rate measurement device can thereby identify a gas appliance as quickly as the sensor operates. An algorithm for use in measurement is simpler as compared with the pattern matching of the flow rate. Accordingly, the device used for appliance identification is less costly. Since looking to the differentiated flow rate, it becomes reliable to identify an appliance which has become in use even while other appliances are in use, whereby the accuracy of application identification can be improved. Thus, identification of an appliance can be effected accurately with the simpler algorithm. It is further becomes possible to establish different billing schemes for different gas appliances and optimally adjust security values for the gas appliances.

The invention claimed is:

1. A flow rate measurement device for measuring a volume of gas flowing through a gas supply system in which at least one appliance is connected, comprising:
    a flow rate sensor configured to detect at regular intervals a gas flow flowing through the gas supply system;
    a computing unit configured to differentiate the detected gas flow;
    a memory in which profiles of gas consumption by the at least one appliance are storable in relation to identities of the at least one appliance; and
    a judging unit configured to search for a profile among the stored profiles which corresponds to the differentiated gas flow to thereby determine an identity of the at least one appliance, wherein the judging unit comprises an interval controller configured to repeatedly adjust the intervals at which the flow rate sensor detects a gas flow every time a run of search by the judging unit over the stored profiles fails, until the judging unit finds a profile which corresponds to the differentiated gas flow.

2. A flow rate measurement device according to claim 1, further comprising an updater configured to create, based on the detected gas flow, a profile of gas consumption by an appliance, which is storable in relation to an identity of the appliance.

3. A flow rate measurement device according to claim 2, wherein the updater is kept operational for a time period to automatically create a profile of gas consumption by the appliance when the appliance becomes in use during the time period.

4. A flow rate measurement device according to claim 3, wherein the updater automatically creates the profile when it the appliance is determined to be the only appliance being in use.

5. A flow rate measurement device according to claim 3, wherein the updater determines whether the detected gas flow is caused by an appliance whose profile has already been created, in order to prevent a profile from being stored more than once for the same appliance.

6. A flow rate measurement device according to claim 1, further comprising a second memory in which history data regarding gas consumptions through the supply system over time is storable.

7. A flow rate measurement device according to claim 6, further comprises a data compressor configured to compress the history data timewise by leaving out a portion of the data indicative of a constant gas flow.

8. A flow rate measurement device according to claim 6, further comprising a calculator configured to calculate, from the history data, a volume of gas consumed by each of the at least one appliance.

9. A method for measuring a value of gas flowing through a gas supply system in which at least one appliance is connected, comprising:
    defining profiles of gas consumption rate for the at least one appliance storable a memory in relation to identities of the at least one appliance;
    at regular intervals detecting a gas flow flowing through the gas supply system; differentiating the detected gas flow;
    searching for a profile among the stored profiles which corresponds to the differentiated gas flow to thereby determine an identity of the at least one appliance; and
    repeatedly adjusting, by an interval controller, the intervals at which the gas flow is detected every time a run of search over the stored profiles fails, until a profile which corresponds to the differentiated gas flow is found.

10. A method according to claim 9, further comprising creating, based on the detected gas flow, a profile of gas consumption for an appliance, which is storable in relation to the appliance.

11. A method according to claim 10, wherein creating a profile comprises automatically creating a profile of gas consumption for the appliance when the appliance becomes in use during a certain period of time.

12. A method according to claim 11, wherein automatically creating a profile comprises automatically creating a profile when the appliance is determined to be the only appliance being in use.

13. A method according to claim 11, further comprising determining whether the detected gas flow is caused by an appliance whose profile has already been created, in order to prevent a profile from being stored more than once for the same appliance.

14. A method according to claim 9, further comprising defining history data storable in a second memory regarding gas consumptions through the supply system over time.

15. A method according to claim 14, further comprises compressing the history data timewise by leaving out a portion of the data indicative of a constant gas flow.

16. A method according to claim 14, further comprising calculating, from the history data, a volume of gas consumed by each of the at least one appliance.

17. A flow rate measurement device for measuring a volume of gas flowing through a gas supply system in which at least one appliance is connected, comprising:
- a flow rate sensor configured to detect a gas flow flowing through the gas supply system;
- a computing unit configured to differentiate the detected gas flow;
- a memory in which profiles of gas consumption by the at least one appliance are storable in relation to identities of the at least one appliance;
- a judging unit configured to search for a profile among the stored profiles which corresponds to the differentiated gas flow to thereby determine an identity of the at least one appliance; and
- an updater configured to create, based on the detected gas flow, a profile of gas consumption by an appliance, which is storable in relation to an identity of the appliance, wherein the updater is kept operational for a time period to automatically create the profile of gas consumption by the appliance when the appliance becomes in use during the time period and when the appliance is determined to be the only appliance being in use.

18. A flow rate measurement device for measuring a volume of gas flowing through a gas supply system in which at least one appliance is connected, comprising:
- a flow rate sensor configured to detect a gas flow flowing through the gas supply system;
- a computing unit configured to differentiate the detected gas flow;
- a memory in which profiles of gas consumption by the at least one appliance are storable in relation to identities of the at least one appliance;
- a judging unit configured to search for a profile among the stored profiles which corresponds to the differentiated gas flow to thereby determine an identity of the at least one appliance;
- a second memory in which history data regarding gas consumptions through the supply system over time is storable; and
- a data compressor configured to compress the history data timewise by leaving out a portion of the data indicative of a constant gas flow.

19. A method for measuring a value of gas flowing through a gas supply system in which at least one appliance is connected, comprising:
- defining profiles of gas consumption rate for the at least one appliance storable a memory in relation to identities of the at least one appliance;
- detecting a gas flow flowing through the gas supply system; differentiating the detected gas flow;
- searching for a profile among the stored profiles which corresponds to the differentiated gas flow to thereby determine an identity of the at least one appliance; and
- creating, by an updater, based on the detected gas flow, a profile of gas consumption for an appliance, which is storable in relation to the appliance, wherein the profile of gas consumption is automatically created for the appliance when the appliance becomes in use during a certain period of time and when it the appliance is determined to be the only appliance being in use.

20. A method for measuring a value of gas flowing through a gas supply system in which at least one appliance is connected, comprising:
- defining profiles of gas consumption rate for the at least one appliance storable a memory in relation to identities of the at least one appliance;
- detecting a gas flow flowing through the gas supply system; differentiating the detected gas flow;
- searching for a profile among the stored profiles which corresponds to the differentiated gas flow to thereby determine an identity of the at least one appliance; defining history data storable in a second memory regarding gas consumptions through the supply system over time; and
- compressing, by a compressor, the history data timewise by leaving out a portion of the data indicative of a constant gas flow.

* * * * *

UNITED STATES PATENT AND TRADEMARK OFFICE
CERTIFICATE OF CORRECTION

| | |
|---|---|
| PATENT NO. | : 7,809,514 B2 |
| APPLICATION NO. | : 11/932315 |
| DATED | : October 5, 2010 |
| INVENTOR(S) | : Miyata et al. |

It is certified that error appears in the above-identified patent and that said Letters Patent is hereby corrected as shown below:

In the Claims

In column 10, claim 4, line 5, after "creates the profile when" delete "it".

In column 12, claim 19, line 20, after "period of time and when" delete "it".

Signed and Sealed this
Thirty-first Day of May, 2011

David J. Kappos
*Director of the United States Patent and Trademark Office*